United States Patent [19]
Liao et al.

[11] Patent Number: 6,075,329
[45] Date of Patent: Jun. 13, 2000

[54] SPEED CONTROL DEVICE FOR A CEILING FAN

[75] Inventors: Yin-Sheng Liao, Taichung Hsien; Tao-Tang Feng, Taichung, both of Taiwan

[73] Assignee: Rhine Electronic Co., Ltd., Taipei, Taiwan

[21] Appl. No.: 09/332,395

[22] Filed: Jun. 14, 1999

[51] Int. Cl.[7] .................................................. H02P 7/285
[52] U.S. Cl. ........................ 318/268; 318/434; 361/28; 361/31
[58] Field of Search ................................. 318/268, 434, 318/484, 487, 519; 388/915; 310/62, 63; 361/23, 24, 28, 30, 31, 33

[56] References Cited

U.S. PATENT DOCUMENTS

| | | | |
|---|---|---|---|
| 4,719,446 | 1/1988 | Hart | 340/310 A |
| 4,893,067 | 1/1990 | Bhagwat et al. | 388/817 |
| 5,041,825 | 8/1991 | Hart et al. | 340/825.06 |
| 5,652,825 | 7/1997 | Schmider et al. | 388/822 |
| 5,789,894 | 8/1998 | Neiger et al. | 318/781 |
| 6,010,310 | 1/2000 | MacBeth | 417/44.1 |

*Primary Examiner*—Bentsu Ro
*Attorney, Agent, or Firm*—Holland & Hart LLP

[57] ABSTRACT

The present invention provides a speed control device for a ceiling fan which comprises a MOSFET, a signal generator and an overload protector. The MOSFET is connected to the ceiling fan and power source via a bridge rectifier for controlling power supplied to said ceiling fan. The signal generator provides a control signal to the MOSFET, wherein the control signal is a cyclic signal whose voltage level is progressively increased and then decreased when it reaches a predetermined level whereby the MOSFET is cyclically and progressively turned on and turned off. The overload protector is connected between the drain and gate of said MOSFET for detecting an abnormally large current flow through said MOSFET to cut off said MOSFET thereby preventing the ceiling fan from possible damage.

9 Claims, 3 Drawing Sheets

SPEED CONTROL DEVICE FOR A CEILING FAN

BACKGROUND OF THE INVENTION

1. Field of the Invention

The present invention relates to a speed control device for a ceiling fan, more particularly, to a speed control device which adopts a MOSFET as a power control element to control the operation of a ceiling fan thereby providing advantages of stability, simplicity and low cost.

2. Description of Related Art

Conventionally, the speed control device of a ceiling fan makes use of a transformer or capacitor in cooperation with a switch or Triac to control the speed of a ceiling fan. However, the use of the transformer and capacitor, which are large and heavy, will significantly increase the weight of the ceiling, fan and thus cause a safety problem as the ceiling fan is hung on a ceiling. Moreover, if multi-speed control is desired, the speed control device must have a plurality of Triacs, which further increases the weight of the ceiling fan and makes the safety problem even worse. Another conventional speed control device for controlling the speed of a ceiling fan is to adopt a Triac to control the phase of power source. Although this conventional speed control device is simple in structure, it causes the motor of the ceiling fan to generate lots of noise when rotating. Therefore, there is a need for the above ceiling fan speed control device to be improved.

SUMMARY OF THE INVENTION

It is one object of the present invention to provide a speed control device for a ceiling fan which adopts a MOSFET as the power control element for controlling the operation of the ceiling fan to overcome the disadvantages of the above-mentioned conventional method.

It is another object of the present invention to provide a speed control device for a ceiling fan which has a overload protector to protect the ceiling fan from overload damage and to provide a capability to automatically resume normal operation of the speed control device after the overload condition is obviated.

It is one aspect of the present invention to provide a speed control device for a ceiling fan, which comprises a MOSFET, a signal generator and an overload protector. The MOSFET is connected to the ceiling fan and power source via a bridge rectifier for controlling the power supplied to said ceiling fan. The signal generator provides a control signal to the MOSFET, wherein the control signal is a cyclic signal whose voltage level is progressively increased and then decreased when it reaches a predetermined level whereby the MOSFET is cyclically and progressively turned on and turned off. The overload protector is connected between the drain and gate of said MOSFET for detecting an abnormally large current flow through said MOSFET to cut off said MOSFET thereby preventing the ceiling fan from possible damage.

Other objects, advantages, and novel features of the invention will become more apparent from the following detailed description when taken in conjunction with the accompanying drawings.

DETAILED DESCRIPTION OF PREFERRED EMBODIMENT

Figure 1:
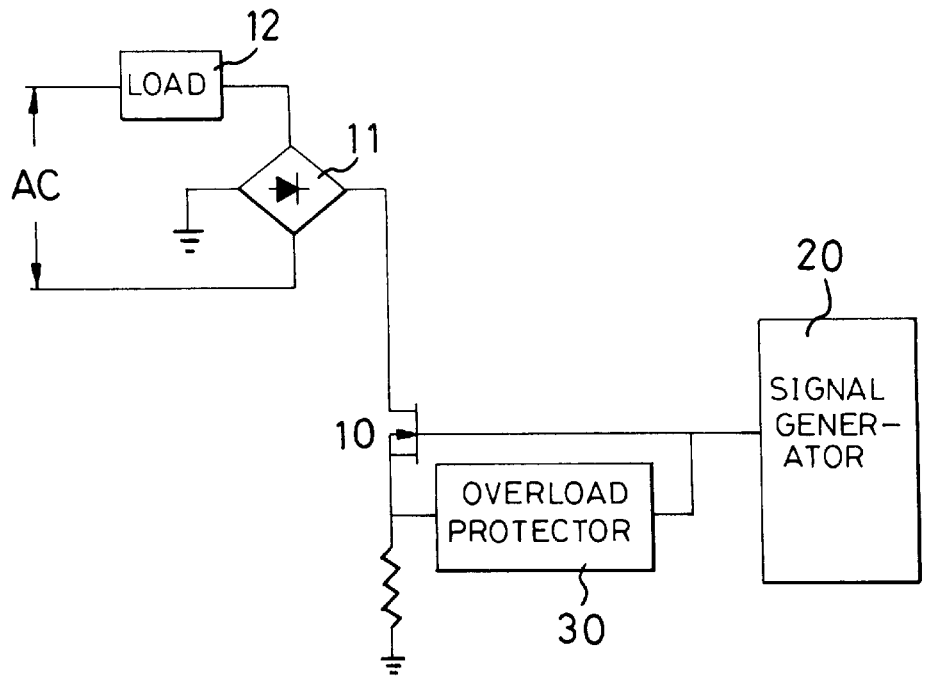
FIG. 1 is a circuit block diagram of a speed control device for a ceiling fan in accordance with the present invention.

FIG. 1 shows a speed control device for a ceiling fan in accordance with the present invention. The speed control device makes use of a MOSFET 10 as a power control element for controlling the speed of a ceiling fan. The source of the MOSFET 10 is connected to a load 12 (which is a motor or lamps of the ceiling fan) and AC power source via a bridge rectifier 11. Therefore, the MOSFET 10 is able to control the current flow through the load 10 thereby controlling the speed of the ceiling fan.

To trigger the MOSFET 10, a signal generator 20 is provided. The signal generator 20 generates a DC voltage type control signal for triggering the MOSFET 10. An equivalent resistor is formed between the source and drain of the MOSFET 10. Because of the voltage-dividing effect caused from the equivalent resistor and the load 12, the rotation speed of the motor in the ceiling fan changes as the equivalent resistor is changing. In other words, the speed of the ceiling fan can be adjusted by setting the signal generator 20 to generate a control signal with a proper voltage level. As a result, the circuit structure of the speed control device for a ceiling fan is simplified, the efficiency of the motor of a ceiling fan is enhanced, and the cost to produce ceiling fans is lowered. In addition, because the MOSFET 10 itself is an semiconductor element, the speed control device is suitable to be fabricated in an integrated circuit.

The control signal is a cyclic signal whose voltage level is progressively increased and then decreased when it reaches a predetermined level. Under the repeating increase and decrease in the voltage level of the control signal, the ceiling fan motor keeps in a stable rotation speed due to its rotating inertia.

Figure 2:
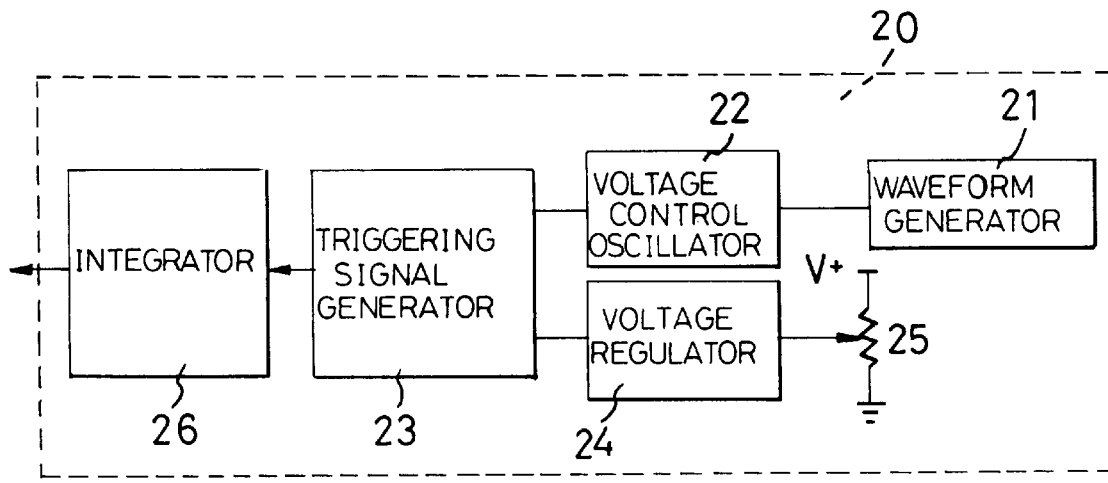
FIG. 2 is a circuit block diagram of the signal generator in FIG. 1.

The detail architecture of the signal generator 20 is shown in FIG. 2, which comprises a waveform generator 21, a voltage control oscillator 22, a triggering signal generator 23, a voltage regulator 24 and an integrator 26. The waveform generator 21 generates a triangular wave. The voltage control oscillator 22 receives the triangular wave from the waveform generator 21 for generating an oscillating signal. The triggering signal generator 23 receives the oscillating signal from the voltage control oscillator 22 and a base voltage output from the voltage regulator 24 for generating a trigger signal whose wavelength and amplitude are both adjustable. The trigger signal is then applied to the integrator 26 for generating the control signal to trigger the MOSFET 10. Moreover, the voltage regulator 24 has an input connected to a voltage meter 25 for receiving an input voltage therefrom and generating the base voltage. The voltage level of the input voltage can be changed by adjusting the voltage meter 25 whereby the voltage levels of the base voltage and the trigger signal can be changed, and thus the speed of the ceiling fan can be adjusted. The voltage meter 25 can be a variable resistor or a D/A converter. In this preferred embodiment, the voltage meter 25 is a variable resistor connected between a power source V+ and the voltage regulator 24.

The triggering signal generator 23 can be an add circuit having two inputs for connection with the outputs of the voltage control oscillator 22 and the voltage regulator 24, respectively. The voltage control oscillator 22 generates a PWM (pulse-width-modulation) oscillating signal at its output for transmitting to the add circuit. The voltage level of the PWM oscillating signal is then increased by adding the same with the base voltage from the voltage regulator 24. The magnitude of the voltage level that is increased is controlled by adjusting the voltage meter 25 connected to the input of the voltage regulator 24.

Figure 3:
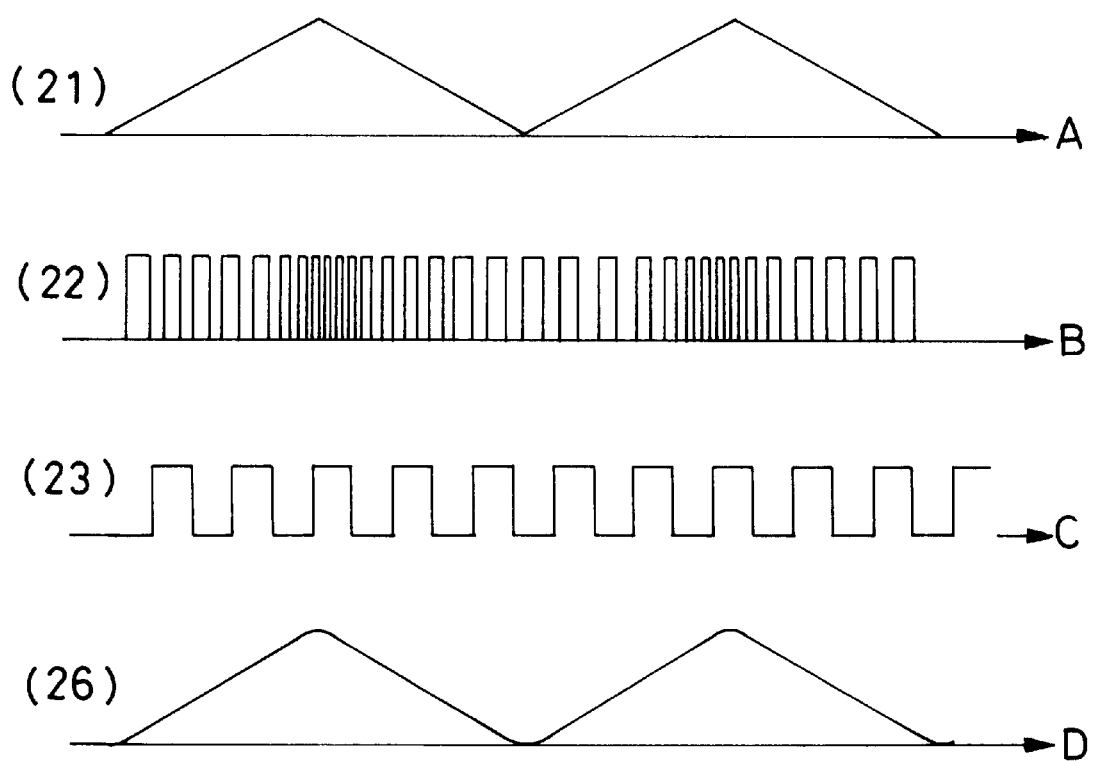
FIG. 3 shows signal waveforms for describing the operation of the speed control device for a ceiling fan in accordance with the present invention.

To be more specific, FIG. 3 shows signal waveforms for describing the operation of the speed control device for a ceiling fan in accordance with the present invention. The top-most waveform, designated as waveform A, is the triangular wave generated by the waveform generator 21 of the signal generator 20. This triangular wave is sent to the voltage control oscillator 22 for generating an oscillating signal as designated by waveform B. Because the wavelength of the signal generated by the voltage control oscillator 22 can be varied, the oscillating signal is a PWM signal with adjustable pulse width. This PWM signal is then sent to the triggering signal generator 23 which increases the voltage level of the PWM signal by adding the base voltage input from the voltage regulator 24. As a result, the trigger signal output from the triggering signal generator 23 is a PWM signal with a higher voltage level (this PWM signal is higher than the original one by a voltage level equal to the base voltage) as designated by waveform C. The magnitude of the base voltage can be adjusted to satisfy the actual requirement. The trigger signal is then sent to the integrator 26 thereby generating a control signal designated as waveform D which is a cyclic signal whose voltage level is progressively increased and then decreased when it reaches a predetermined level. This control signal is applied to the MOSFET 10 and thus the MOSFET 10 is cyclically and progressively turned on and turned off whereby the rotation speed of the ceiling fan motor remains stable due to its rotating inertia. Moreover, because the voltage level of the trigger signal from the triggering signal generator 23 can be changed, the speed of the ceiling fan can be controlled by simply adjusting the voltage meter 25.

Referring to FIG. 1 again, an overload protector 30 is provided between the drain and gate of the MOSFET 10 for detecting whether there is an abnormally large current therebetween. If a current whose value is larger than a threshold value flows through the MOSFET 10, the overload protector 30 will turn off the MOSFET 10 and thus stop supplying power to the load 12 thereby avoiding possible damage to the ceiling fan caused by an abnormal condition. After the abnormal condition is obviated and the large current is no longer presented, the overload protector 30 turns on the MOSFET 10 and normal operation is resumed.

Figure 4:
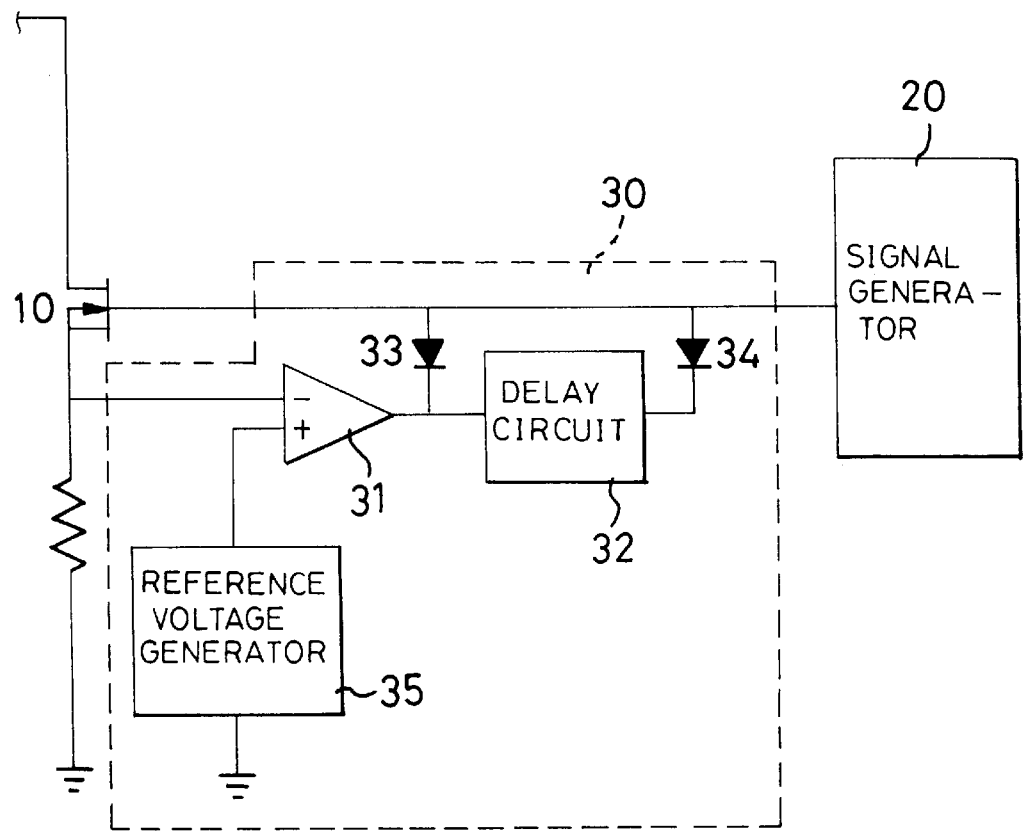
FIG. 4 is a circuit block diagram of the overload protector in FIG. 1.

FIG. 4 shows the detailed circuit block diagram of the overload protector which comprises an overload detector 31, a delay circuit 32, two diodes 33,34 and an reference voltage generator 35. The overload detector 31 is preferably a compare circuit whose negative input and positive input are connected to the drain of the MOSFET 10 and an output of the reference voltage generator 35, respectively, and whose output is connected to an input of the delay circuit 32. The anodes of the two diodes 33,34 are both connected to the gate of the MOSFET 10 while the cathodes thereof are connected to the outputs of the overload detector 31 and the delay circuit 32, respectively. The reference voltage generator 35 provides a reference voltage to the overload protector 31 for determining whether the MOSFET 10 is overloaded. The delay circuit 32 provides a delay operation to the overload protector 30 to ensure its stability.

In normal operation, the voltage on the negative input of the overload detector 31 is smaller than the reference voltage on the positive input thereof, and therefore the output of the overload detector 31 is a positive voltage. At this time, the MOSFET 10 is still under the control of the signal generator 20 but not influenced by the overload protector 20. If the load 12 is out of order or has a short circuit, the current flow through the MOSFET 10 is abruptly increased which results in the voltage on the negative input of the overload detector 31 being larger than the reference voltage on the positive input thereof. At this time, the output of the overload detector 31 is low whereby the gate voltage of the MOSFET 10 is low to cut off the MOSFET 10 and stop supplying power to the load 12.

When the MOSFET 10 is cut off, there is no current flow through the drain thereof and thus the overload protector 30 resumes its normal operation. However, the gate of the MOSFET 12 will remain low for a period of time caused by the delay circuit 32 before the MOSFET 10 is turned on. When the MOSFET 10 is on again, and if the load 12 is still out of order, similarly, a large current still flows through the MOSFET 10, and the overload detector will detect the large current to cut off the MOSFET 10. The above process to cut off the MOSFET 10 and then turn it on after a delay time repeats until the load 12 resumes its normal operation. Therefore, the overload protector 30 not only protects the speed control device against overload damage but also provides a capability to automatically resume normal operation of the speed control device after an overload condition is obviated.

Figure 5:
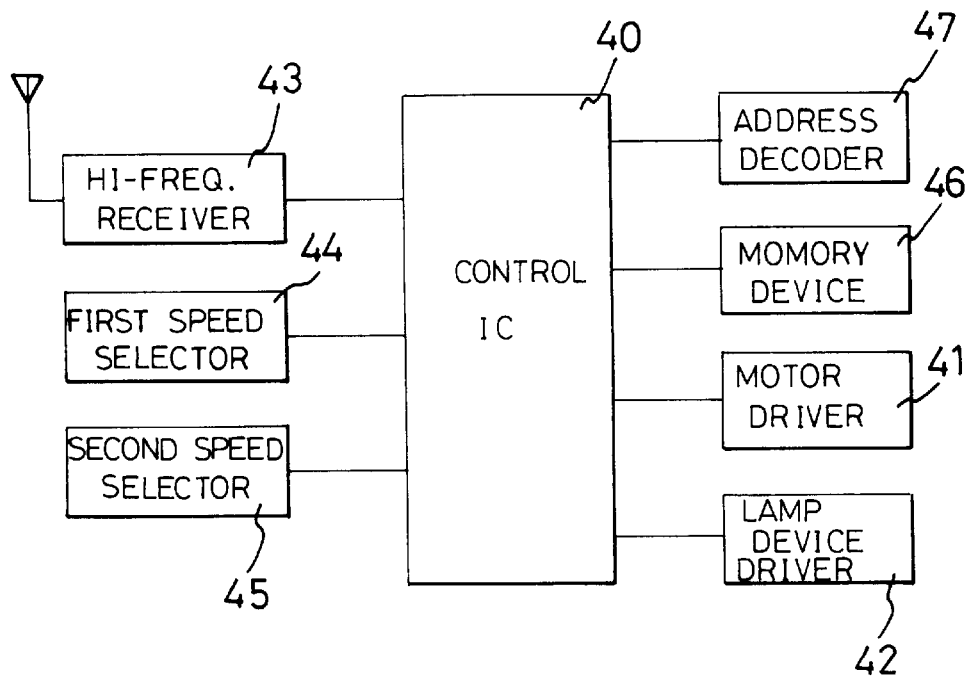
FIG. 5 shows an application of the speed control device in accordance with the present invention for remotely controlling a ceiling fan.

Referring to FIG. 5, an application of the speed control device in accordance with the present invention is shown for remotely controlling a ceiling fan. In this application, a control IC 40 is provided with two outputs, each generates a trigger signal with adjustable wavelength and amplitude, as described in the signal generator 20, for controlling a motor driver 41 and a lamp device driver 42, respectively. Furthermore, the control IC is provided with a Hi-frequency receiver 43, a first speed selector 44, a second speed selector 45, a memory device 46 and an address decoder 47. Accordingly, the lamp device and the rotation speed of the motor of the ceiling can be remotely controlled.

Although the present invention has been explained in relation to its preferred embodiment, it is to be understood that many other possible modifications and variations can be made without departing from the spirit and scope of the invention as hereinafter claimed.

What is claimed is:

1. A speed control device for a ceiling fan, comprising:
   a MOSFET for controlling power supplied to said ceiling fan; and
   a signal generator for providing a control signal to said MOSFET, Wherein said control signal is a cyclic signal whose voltage level is progressively increased and then decreased when it reaches a predetermined level whereby said MOSFET is cyclically and progressively turned on and turned off.

2. The speed control device for a ceiling fan as claimed in claim 1, wherein said signal generator comprises:
   a waveform generator for providing a triangular waveform;
   a voltage control oscillator for receiving said triangular waveform from said waveform generator to generate an oscillating signal;

a voltage meter for providing an input voltage;

a voltage regulator for receiving said input voltage to provide a base voltage;

a triggering signal generator for receiving and adding said oscillating signal and said base voltage to generate a trigger signal; and an integrator for receiving said trigger signal to generate said control signal.

3. The speed control device for a ceiling fan as claimed in claim 2, wherein said voltage meter is a variable resistor.

4. The speed control device for a ceiling fan as claimed in claim 2, wherein said voltage meter is a D/A inverter.

5. The speed control device for a ceiling fan as claimed in claim 2, wherein said triggering signal generator is an add circuit.

6. The speed control device for a ceiling fan as claimed in claim 1 wherein said speed control device is fabricated in an integrated circuit.

7. The speed control device for a ceiling fan as claimed in claim 1, further comprising an overload protector connected between the drain and gate of said MOSFET for detecting an abnormally large current flow through said MOSFET to cut off said MOSFET.

8. The speed control device for a ceiling fan as claimed in claim 7, wherein said overload protector comprises:

an overload detector having a negative input, a positive input and an output, said negative input being connected to the drain of said MOSFET;

a reference voltage generator having an output connected to said positive input of said overload detector;

a delay circuit having an input and an output, said input being connected to the output of said overload detector;

a first diode whose anode is connected to the gate of said MOSFET and whose cathode is connected to the output of said overload detector;

a second diode whose anode is connected to the gate of said MOSFET and whose cathode is connected to the output of said delay circuit.

9. The speed control device for a ceiling fan as claimed in claim 8, wherein said overload detector is a compare circuit.

* * * * *